March 20, 1934.   R. L. DODGE ET AL   1,951,651
CHANGE SPEED TRANSMISSION GEARING
Original Filed Dec. 4, 1929   3 Sheets-Sheet 1
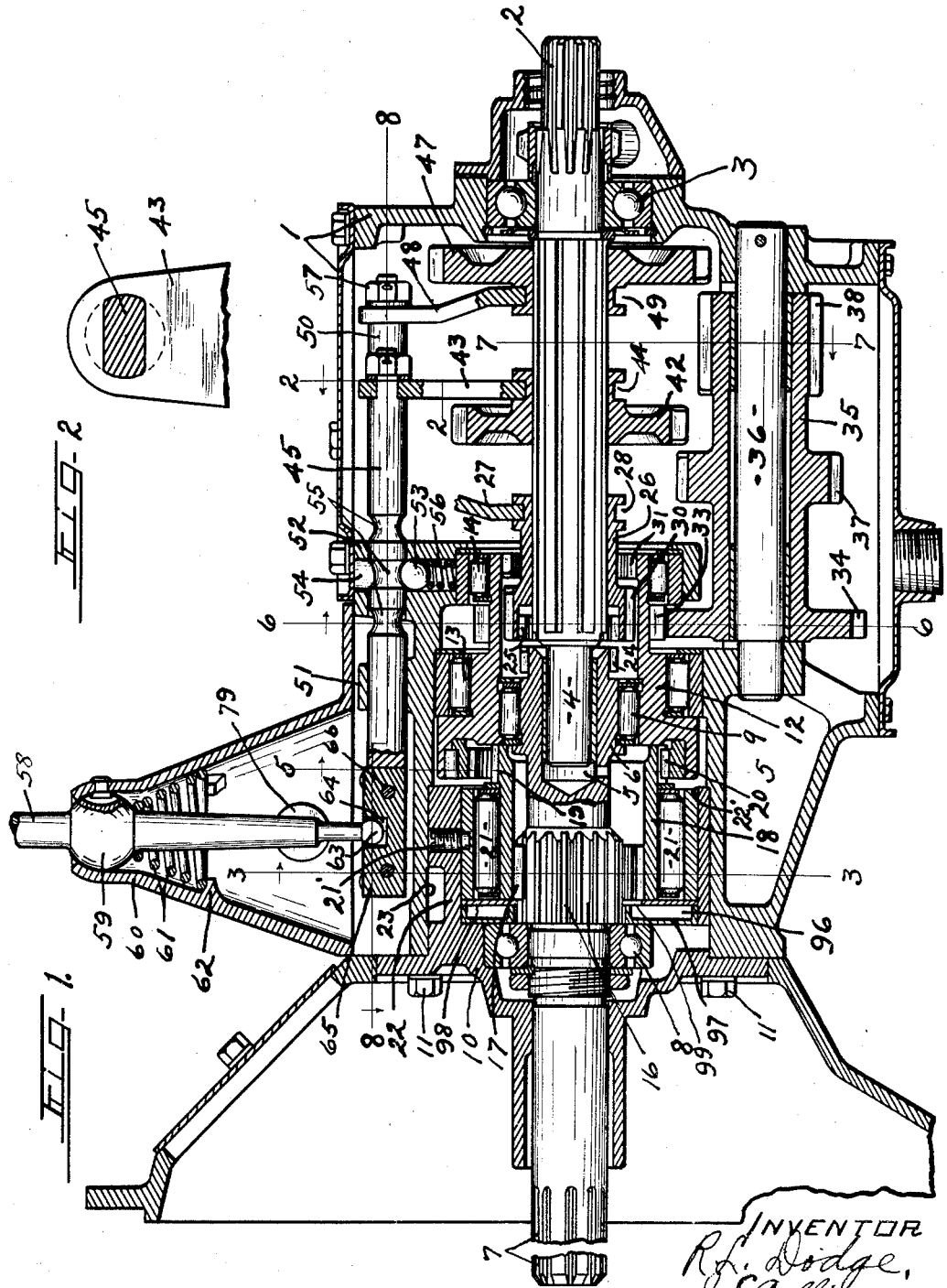

March 20, 1934. R. L. DODGE ET AL 1,951,651
CHANGE SPEED TRANSMISSION GEARING
Original Filed Dec. 4, 1929  3 Sheets-Sheet 2
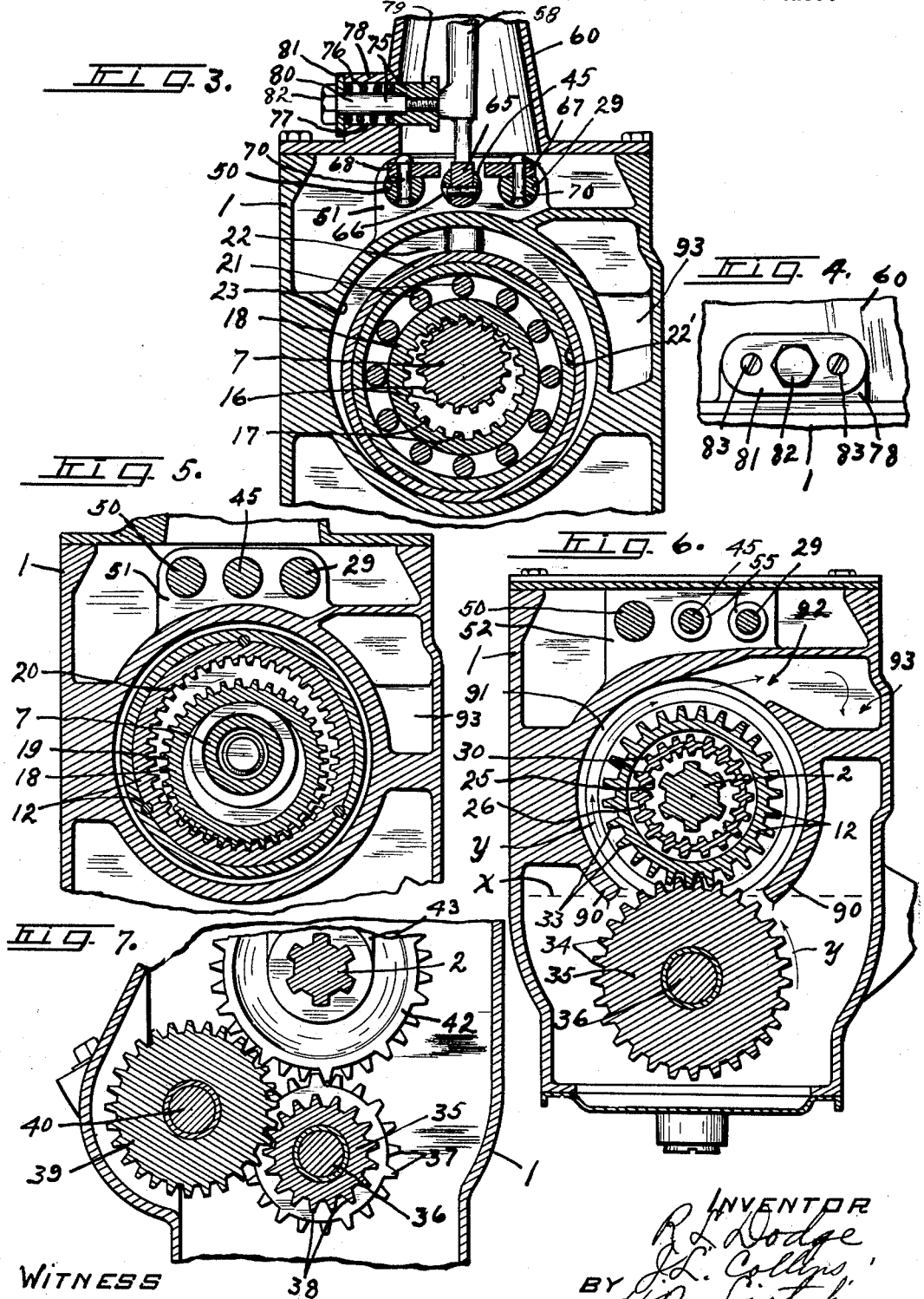

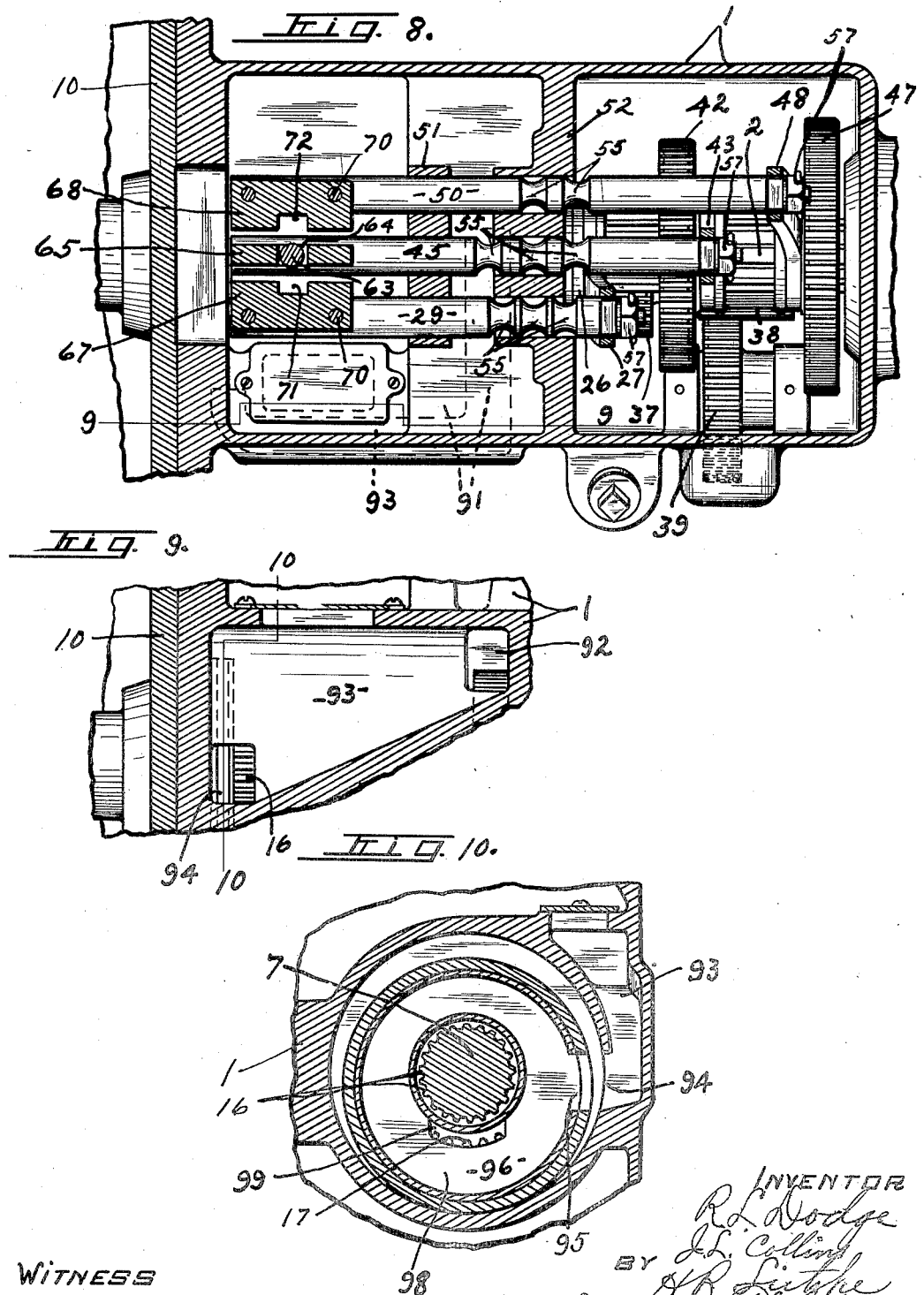

Patented Mar. 20, 1934

1,951,651

UNITED STATES PATENT OFFICE 1,951,651

CHANGE SPEED TRANSMISSION GEARING

Ralph L. Dodge, John L. Collins, and Henry Robert Lietzke, Syracuse, N. Y., assignors to New Process Gear Company, Inc., Syracuse, N. Y., a corporation of New York Application December 4, 1929, Serial No. 411,706
Renewed January 31, 1934

4 Claims. (Cl. 74—57)

This invention relates to a change speed transmission gearing for transmitting a plurality of speeds and a reverse drive from a driving member such as the engine shaft of an automobile to the propeller or rear axle driving shaft.

The gearing comprises essentially a clutch connection between driving and driven members for direct drive, that is, causing the driving and driven members to rotate at the same speed. It also includes means for connecting the driving member to the driven member for a reduced speed including an eccentrically mounted internal external gear member meshing internally with a spur gear which is connected to the driving member and externally with a second internal external or composite gear member mounted coaxial with the driving and driven members and which is adapted to also have a clutch connection with the driven member. The external gear of the second internal gear member is adapted to co-operate with a spur gear rotatably mounted on a relative short shaft for the purpose of obtaining still further reduced speed ratios and a reverse drive.

The general object of this invention is to produce a simple and compact form of changing speed gearing mechanism of the four speed type which will combine consistent lightness with strength, rigidity, and durability of construction and quietness and ease of operation.

In carrying out the principles of the foregoing object, we have arranged a gearing in such a manner that the second speed drive, that is the gearing causing the rotation of the driven member at a speed somewhat reduced to that of the driving member, is accomplished through alternating external and internal gearing thereby producing a substantially silent transmission of power at this speed ratio.

Another object is to utilize a portion of the gearing to act as an oil pump for elevating the lubricating oil to the upper portion of the gear case and depositing it into an oil bypass provided in the wall of said case through which it may gravitate to an outlet port in registration with an oil reservoir adapted to feed the oil to the central portion of the internal external gearing mechanism for the direct or high and second speed driving mechanism for proper and adequate lubrication thereof.

A further object is to position suitable bearings for all rotating members such as the gears, shifts, etc., in such a manner that they will be supported by the gear case and also be positioned at or as near as possible to the outer ends of the respective rotating members thereby reducing the over-hang of the members thereon to a minimum and maintain each of said members more rigidly in its operating position than it is believed has been done heretofore.

A still further object is to mount all sliding or shifting members in such a manner that they will be positioned above the normal level of the lubricating oil and thereby be moved with greater ease especially when the oil is cold or heavy.

Another object is to provide a gear shifting mechanism which will be simple and convenient for effecting a quick and easy slide shift of gear or clutch members to change from one speed to another and to conform in operation as nearly as possible to the standard shift for the usual three speed type of transmission gearing.

Still another object is to facilitate the manufacture of a transmission gearing by constructing it in such a manner that different portions of the mechanism may be assembled into separate units which may be assembled in their proper relation in the case to form a complete gearing mechanism.

Other objects and advantages relating to the detail of the structure and form and relation of parts thereof, will more fully appear from the following description taken in connection with the accompanying drawings, in which:—

Fig. 1 is a longitudinal vertical section taken through a transmission gearing embodying the various features of my invention.

Fig. 2 is an enlarged detail section taken in the plane of the line 2—2, Fig. 1.

Fig. 3 is a transverse section taken in the plane of the line 3—3, Fig. 1.

Fig. 4 is a plan of the retaining plate for the selector lever guide bolt.

Figs. 5, 6 and 7 are transverse vertical sections taken in the plane of the lines 5—5, 6—6 and 7—7 respectively, Fig. 1.

Fig. 8 is a detail horizontal section taken in the plane of the line 8—8, Fig. 1.

Fig. 9 is a detail vertical section taken in the plane of line 9—9, Fig. 8.

Fig. 10 is a detail section taken in the plane of line 10—10, Fig. 9.

The preferred form of the invention as illustrated in the accompanying drawings consists of a case 1 in which is rotatably mounted a driven shaft 2 supported near the outer rear end thereof by a rolling bearing member 3, positioned in the adjacent end portion of the case 1. The driven shaft 2 extends within the case 1 and has the forward end as 4 thereof reduced so as to be journaled in the bore 5, provided in the enlarged inner end 6 of a drive shaft 7 which is rotatably mounted in the case 1 in axial alignment with the driven shaft 2.

The drive shaft 7 is supported, in this instance, at two points by a pair of spaced rolling bearing members 8 and 9. The bearing 8 is positioned near the forward end of the case 1 and is supported in a detachable end cover or cap 10, secured to the forward end of the case 1 by bolts or screws 11, while the bearing 9 is positioned near the rear end of the drive shaft 7 and supported by the body portion of an external internal composite gear member 12 which, in turn, is rotatably mounted in a pair of rolling bearing members 13 and 14, mounted in operative spaced relation in the adjacent walls of the case 1. The bearing 13 is located near the forward end of the composite gear member 12 and is in substantially the same vertical plane as the drive shaft bearing 9 and the forward end 4 of the driven shaft 2 thereby forming a stable bearing support for the inner ends of the drive shaft and the driven shaft. In other words this particular construction prevents any lateral or vibratory movement of the inner ends of the driving and driven shafts which does not occur when the supporting bearings are positioned at a distance from the ends of the respective shafts.

The bearing 14 is positioned at the other or rear end of the composite gear member 12 and co-acts with the bearing 13 to form an adequate supporting means for said gear member and prevents any undue vibration thereof.

The drive shaft 7 extends outwardly from the forward end of the case 1 and is adapted to be connected at its outer end to a suitable driving means, not shown, such as the crank-shaft of an internal combustion engine. A spur gear 16 secured to or integral with the drive shaft 7 and rotating therewith, is positioned intermediate the bearings 8 and 9, preferably just inside the bearing member 8 and is adapted to mesh with the teeth of an internal gear 17 positioned at the forward end of the eccentrically mounted internal external gear member 18.

The external gear 19 is positioned at the rear end of said member 18 and is adapted to mesh with the teeth of an internal gear 20 secured to the forward end of the composite gear member 12.

The internal external gear member 18 is rotatably mounted eccentrically to the axis of the drive shaft 7 in suitable rolling bearing 21, positioned between the external gear 19 and the forward end of the gear member 18, said bearing being supported in a suitable shell or housing member 22 positioned in a bore 23 provided in the forward end of the case 1. The housing member 22 is secured to or made integral with the inner face of the end cover 10 and extends inwardly from the cover 10 a sufficient distance to support the bearing member 21 which is secured in a bore 22' in the housing 22 made eccentric to the axis of the drive shaft 7 by a screw 21'.

The rear end of the drive shaft 7 is provided with external clutch teeth 24 which are adapted to mesh with complementary internal teeth 25, positioned at the forward end of a clutch collar 26 which is slidably mounted upon the driven shaft 2 and splined thereto so as to rotate therewith.

The clutch collar 26 may be operated in the usual manner as by a bifurcated arm 27 which is positioned in an annular groove 28 provided at the rear end of the clutch collar 26, and having the upper end thereof secured to the rear end of a horizontally disposed shifting rod 29. The clutch collar 26 is also provided with external clutch teeth 30, positioned at the forward end thereof and adapted to cooperate with complementary internal clutch teeth 31, provided at the rear end of the composite gear member 12.

In Fig. 1, the clutch collar 26 is shown in its normal inoperative position with the clutch teeth thereof located intermediate the clutch teeth 24 provided on the rear end of the drive shaft 7 and the clutch teeth 31 integral with the rear end of the composite gear member 12, thus when direct drive is desired the clutch collar 26 is moved forwardly from the normal position to the clutching position with the drive shaft, with the clutch teeth 24 and 25 in mesh thereby locking the drive shaft 7 and the driven shaft 2 together.

When the first speed reduction is desired, the clutch collar 26 is moved rearwardly from either the direct speed driving position or the normal position to the clutching position with the composite gear member 12 with the clutch teeth 30 and 31 in mesh, whereupon the driven shaft will be rotated by the drive shaft through the medium of the spur gear 16, the internal external eccentrically mounted gear member 18 and the composite gear member 12.

The composite gear member 12 is also provided with an external gear 33 positioned intermediate the bearings 13 and 14 and adapted to be in permanent mesh with the gear teeth 34 positioned at the forward end of a spur gear member 35 which is rotatably mounted on a relatively short stationary horizontal disposed shaft 36 supported at its ends in a plane below the driven shaft 2, by the case 1.

The spur gear member 35 is also provided with gear teeth 37 positioned intermediate the ends thereof and of less pitch diameter than the teeth 34 while gear teeth as 38 are provided at the rear end of said spur gear member and having a shorter pitch diameter than either the teeth 34 or 37. The forward portion of the gear teeth 38 are adapted to be in permanent mesh with the teeth of idle gear 39 rotatably mounted on a short horizontally disposed shaft 40 which is secured at its ends to the adjacent portion of the case 1, see Figs. 7 and 8.

The idle gear 39 is so positioned in relation to the driven shaft 2 and the spur gear shaft 36 that the idle gear 39 is not only in permanent mesh with the teeth 38 but is also adapted to mesh with the teeth of a spur gear 42 which is splined to the driven shaft 2, intermediate the clutch collar 26 and the rear end of the case 1. The spur gear 42 is normally located in operative position in the vertical plane substantially midway between the teeth 37 and the idle gear 39 so that if it is desired to obtain the second speed reduction the spur gear 42 may be moved forwardly along the driven shaft 2 to mesh with the teeth 37 on the spur gear member 35 or, if it is desired to shift to the reverse drive, this may be obtained by moving the spur gear 42 rearwardly to meshing engagement with the idle gear 39. These movements of the spur gear 42 may be accomplished in the usual manner, through the medium of a bifurcated shifting arm 43 engaging in an annular groove 44 provided in a rearwardly projecting flange, formed on the spur gear 42 and having the upper end of said arm secured to the rear end of a shifting rod 45 which will be more fully described hereinafter.

Another spur gear 47 is splined to the driven shaft 2 and normally located in inoperative position intermediate the inner face of the adjacent rear end of the case 1 and the gear teeth 38, provided on the rear end of the spur gear member 35. The spur gear 47 is adapted to mesh with the rear portion of the teeth 38 for the purpose of obtaining the fourth drive speed ratio and may, when it is desired, be moved forwardly along the driven shaft 2 to operative engagement with said teeth 38 by means of a suitable bifurcated shifting arm 48, adapted to engage the side walls of an annular groove 49 formed in a forwardly projected flange on the spur gear 47.

The upper end of the arm 48 is secured to the rear end of a horizontally disposed shifting rod 50.

The shifting rods 29, 45 and 50 are constructed similarly to the rods usually provided for this purpose and consist, in this instance, of rods circular in cross-section and slidably mounted in suitable respective supports 51 and 52, positioned in spaced relation intermediate the ends of the shifting rods and disposed transversely of, and in this instance, integral with the upper portion of the case 1. The rods 29, 45 and 50 may be retained in their shifting position by any suitable means such as a ball 53 positioned in a bore 54 provided in the support 52 in vertical alignment with each of said rods, said ball being normally held in registration with a concave annular groove 55 provided in each of said rods, one for each of the adjusted positions required therefor. The balls 53 may each be yieldingly held in their operative position by a compression spring 56 positioned between each of the balls 53 and the lower end of the respective bore 54, so that when the rods are moved longitudinally, the ball 53 will be forced downwardly out of registration with the particular groove 55 against the action of the respective spring 56 until the next successive groove is brought into registration with the ball 53, whereupon such ball will be forced into registration therewith by the action of the respective spring 56. The rods are maintained in their normal position against rotation by the respective shifting arms 27, 43 or 48 each of which has its upper end provided with a perforation of greater length than the width thereof, and adapted to receive a correspondingly flattened end portion of the respective rods 29, 45 or 50 (see Fig. 2).

The arms are secured in position upon the respective rods by means of a lock washer and nut 57 screw-threaded on the rear end of each of said rods. Each of the shifting rods 29, 45 and 50, together with their respective shifting arms 27, 43 and 48 and the members actuated therewith may be easily selected and moved independently of the others by means of the usual selector lever 58 which is pivotally supported at 59 by the upper end of a bracket 60 secured to the upper surface of the case 1.

The lever 58 may be yieldingly supported in its operating position in the bracket 60 by a coil spring 61, which, in this instance, is conical in cross-section and has its upper end adapted to engage the arm at 59, while the lower end is supported by suitable lugs as 62 secured to or integral with the bracket 60.

The selector lever 58 is normally disposed in a vertical position with the lower end thereof as 63 terminating in the horizontal plane of the shifting bars and positioned in an aperture 64 provided in a shift plate 65 secured to the forward end of the centrally located shifting rod 45, Figs. 1 and 8.

The shifter plate 65 may, as shown, be positioned in a vertical slot provided in the forward end of the rod 45 and secured to said rod by screws or rivets 66.

The shifting rods 29 and 50 are each provided at their forward end with inwardly projecting horizontally disposed shifter plates 67 and 68 respectively. The forward end of the rods 29 and 50 have their upper surfaces cut away to form a flattened portion adapted to receive the respective shifter plate which may be secured to said rods by screws or rivets 70. The inner edges of said shifter plates terminate in close relation to the adjacent side of the shifter plate 65 and are provided with inwardly facing slots or apertures 71 and 72 respectively, adapted to receive the inner or lower end 63 of the selector lever 58.

The selector plates 65, 67 and 68 are so arranged, that when the respective shifting rods and the clutch or gear member actuated thereby are in the neutral or inoperative position, that the apertures 64, 71 and 72 will be in the same transverse plane or in other words will be in operative alignment so that it is only necessary for the operator to move the upper end of the selector lever 58 transversely in one direction or the other to move the lower end 63 into operative engagement with one or the other of the apertures 71 or 72, which is the usual operation in the standard or three speed type of gear transmission.

In operation with the shifting rods in the neutral position, as illustrated in Fig. 8, the selector lever 58 will be maintained in a vertical position with the lower end 63 in registration with the aperture 64 of the shifter plate 65 by the action of the spring 61, so that it is only necessary for the operator to move the selector lever 58 longitudinally forwardly or rearwardly when the reverse drive or the second reduced speed drive ratio is desired.

In other words, if the operator moves the upper end of the selector lever forward longitudinally, the lower end will be moved in the reverse direction or rearwardly, this causing the shift rod 45 and the spur gear 42 actuated thereby, to be moved rearwardly until the forward positioned groove 55 registers with the ball 53 whereupon said spur gear will be in mesh with the idle gear 39, thereby causing the driven shaft 2 to rotate in the reverse direction to that at which the driving shaft rotates. If however, the selector lever 58 is moved in the reverse direction, the shifting lever 45 and spur gear 42 will be moved forwardly until the ball 53 registers in the rearwardly constructed groove 55 whereupon said spur gear will be in mesh with the teeth 37 of the spur gear member 35 and the driven shaft 2 will thus be driven at the second reduced speed ratio to that of the driving shaft.

When it is desired to shift for the direct drive or for the first reduced speed ratio, it is only necessary for the operator to move the upper end of the selector lever 58 in the usual manner, that is, transversely to the right of the case 1, which action will bring the inner end 63 of said lever into registration with the aperture 71 of the shifter plate 67, then by moving the upper end of the lever 58 forwardly longitudinally, the lower end 63 and the shifting rod 29 will be moved rearwardly until the ball as 53 will engage the forwardly constructed groove 55 of the rod 29 and the clutch collar 26 actuated by said rod will be in clutching engagement with the composite gear 12, whereupon the driven shaft 2 will be driven at the first reduced speed ratio.

If it is desired to obtain the direct drive, it is now only necessary to move the upper end of the selector lever 58 rearwardly until the ball 53 engages the rearwardly constructed groove 55 of the rod 29 when the clutch collar 26 will be in clutching engagement with the clutch teeth 24 constructed on the rear end of the drive shaft 7, thus causing the driven shaft 2 and the driving shaft 7 to rotate at the same speed.

The gear shift described thus far is substantially the same as the standard gear shift for the three speed type of gear transmission and, if it is desired to shift to the fourth speed ratio from the neutral position, that is, with the selector lever in the vertical position, as shown in Figs. 1 and 8, it is only necessary for the operator to first move the upper end of the selector lever 58 transversely to the left of the case 1, to cause the lower end 63 of the rod to enter the slot 72 of the selector plate 68 then move the upper end of said lever rearwardly longitudinally, of the case so that the shifting rod 50 and spur gear 47 actuated thereby will be moved forwardly until the ball 53 engages the rearwardly constructed groove 55 of said rod, whereupon the spur gear 47 will mesh with the teeth 38 of the spur gear member 35.

When it is desired to return the gear to the neutral or inoperative position, it is only necessary for the operator to move the upper end of the selector lever 58 forwardly to cause the rearward movement of the rod 50 until the ball 53 again engages the forwardly constructed groove 55 in the rod 50. Whereupon the spur gear 47 will have been returned to its normal position and the selector lever 58 will have the lower end thereof in alignment with the aperture 64 in the shift plate 65 in position to be returned to the normal vertical position by the action of the spring 61 and the spring pressed plunger 75.

Th plunger is located in a bore 77 provided in a boss 78, located in the bracket 60 near the base thereof, and at the side of the selector lever 58 at which the shifting rod 50 is located. The plunger 75 consists of a head portion 79 of substantially the same diameter as the bore 77, and is provided with an annular flange at the inner edge thereof, to form a flat surface of sufficient area so that the head 79 will be in contact with the adjacent portion of the lever 58 whenever the lower end 63 is in registration with the slots 64 and 72. The head 79 is screw-threaded to one end of a bolt 80 of less diameter than said head and which extends outwardly through the bore 77 and a suitable perforation in a retaining plate 81 with head 82 of said bolt normally engaging the outer surfaces of said retaining plate. The plate 81 may be secured in place by screws 83, screw-threaded in the boss 78.

The spring 76 is coiled about the bolt and positioned between the outer end of head 79 and the inner surface of the retaining plate 81.

The plunger 75 is provided for the purpose of preventing the lower end of the lever 58 from being accidentally moved outwardly in the direction of the shifting rod 50 except by moving the plunger 75 outwardly against the action of the spring 76, thereby assisting in maintaining the selector lever in the vertical or neutral position and making it easier for the operator to make the desired selection for the speed ratio desired.

Referring to Fig. 6 of the drawings, it is evident that with the case 1 constructed as shown with a flange as 90 surrounding a greater portion of the gear teeth 33 so as to form an annular recess 91 in which said teeth may rotate, and with the normal oil level in a plane below the teeth 33 or at substantially the level as indicated by the dotted line $x$, the teeth 34 of the spur gear member 35 together with the teeth 33 of the composite gear member 12 will, when in operation carry a portion of the oil located in the lower portion of the case 1 upwardly in the direction of the arrow $y$ and deposit it by centrifugal force through inlet port 92 tangent to the upper portion of the recess 91 and then into a by-pass chamber as 93, constructed in the side of the case 1 as more clearly indicated in Figs. 6, 9 and 10.

The oil by-pass 93 extends from substantially the horizontal plane of the upper portion of the teeth 33 forwardly to the front end of the case 1, where it is provided with an outlet port 94 in substantially the horizontal plane of the axis of the drive shaft 7 and in registration with an inlet port 95, leading to an oil reservoir 96 formed about the drive shaft 7 and spur gear 16.

The oil reservoir 96 is formed by a U shaped stamping 97 positioned in the forward end of the bearing housing member 22 with the bottom or closed side of said stamping secured by welding or otherwise to the inner face of the cover 10. The opposite or open side of the stamping is closed by a flat annular plate 98 which may be secured to the rim of the stamping 97 in any convenient manner as by welding. The central portion of the stamping 97 is provided with an aperture having an inwardly extending wall formed by bending the bottom in the same direction as the rim and adapted to receive the spur gear 16 therethrough. A corresponding aperture is also provided in the plate 98 to receive the spur gear 16.

The inlet port 95 is formed in the periphery of the stamping 97 adjacent the outlet port 94 of the by-pass 93 while a portion of the plate 98 is perforated to form an outlet port 99 which may, as shown, be positioned at the lower portion of the spur gear 16 so that the oil passing through said outlet port will be deposited in the space between the lower portion of the spur gear 16 and the adjacent portion of the internal gear 17, thereby lubricating said gears and as the oil flows rearwardly, due to the continuous supply of oil from the by-pass, all of the moving parts such as gears, bearings, clutch, etc., positioned in the bore 23 of the case 1 will be adequately lubricated whenever the drive shaft 7 is in operation.

It may now be clearly seen how different parts of the mechanism may be assembled into separate units and then these units be secured to the case 1 in their co-operative relation with each other. For instance, the drive shaft 7, cover plate 10 and housing 22 together with the internal external gear member 18, the composite gear member 12, the respective bearing members 8, 21 and 9 which when assembled, may comprise a unit which may be positioned within the bore 23 of the case 1 and then secured in place by the screws 11. Likewise, the bracket 60, selector lever 58 and plunger 75 connected with said bracket may be assembled into a complete unit and then be secured to the upper portion of the case 1 with the lower end 63 of the lever 58 in operative engagement with the shifting rods 29, 45 and 50, while the driven shaft 2, clutch collar 26 and spur gears 42 and 47 mounted thereon and the shifting rods 29, 45 and 50, etc., constitute another unit when assembled in the case 1.

In the construction shown in Figs. 1 and 7, every two teeth in three on the engaging sides of the teeth 24, 25, 30 and 31 constituting the clutch members and also the teeth 37 and 38 of the spur gear member 35, the teeth of the spur gears 42 and 47 and idle gear 39 are constructed shorter in length than the remaining or every third tooth of the respective members, that is the engaging ends of these teeth are staggered to facilitate the meshing of the respective gears while there is a considerable difference in the speed of each member and also to permit the meshing engagement of the respective members to be accomplished silently and without clashing.

Although I have shown and particularly described the preferred embodiment of the invention, I do not wish to be limited to the exact details of construction shown, as various changes may readily be made without departing from the spirit of this invention as set forth in the appended claims.

We claim:

1. In a transmission gearing, a case provided with a bore in one portion thereof, a driving member mounted concentric with said bore and journaled in the adjacent end of the case, a driven member journaled in the opposite end of the case, co-axial with the driving member, and having its inner end journaled within the inner end of the driving member, an internal external gear member adapted to be driven by the driving member rotatably mounted in the bore eccentric to the driving member, a composite gear member in mesh with said internal external gear member and journaled concentrically with the driving and driven member in spaced bearing members mounted in said bore, and another bearing member supported by the composite gear member positioned in the plane of the inner ends of said members and one of the first-mentioned bearing members for the composite gear and at right angles to the axis of the driving and driven members.

2. In a transmission gearing, a case provided with a bore in one portion thereof, a driving member mounted concentric with said bore and journaled in the adjacent end of the case, a driven member journaled in the opposite end of the case, co-axial with the driving member, and having its inner end journaled within the inner end of the driving member, an internal external gear member adapted to be driven by the driving member, rotatably mounted in an eccentric bearing housing positioned in said bore, a composite gear member in mesh with said internal external gear member and journaled concentrically with the driving and driven members in spaced bearing members mounted in said bore, and a bearing member supported by the composite gear member positioned in the plane of the inner ends of said members and one of the bearing members for the composite gear member and at right angles to the axis of the driving and driven members.

3. In a transmission gearing, a case provided with a bore in one portion thereof and a speed transmission driven mechanism operably mounted in another portion of said case and a driving unit mounted in said bore comprising a drive shaft journaled concentric with said bore and a train of gears operably connecting said drive shaft with the driven mechanism, a housing mounted in said bore adapted to maintain the train of gears in the bore in operative relation with the driven mechanism, and means for removably securing the housing to the case whereby the driving unit may be removed from the case independently of the driven mechanism.

4. In a transmission gearing, a case provided with a bore in one portion thereof and a speed transmission driven mechanism operably mounted in another portion of said case and a driving unit mounted in said bore comprising a drive shaft journaled concentric with said bore and an external internal gear member, and a composite gear geared together and to the drive shaft, one of said gear members having gear teeth in meshing engagement with a gear of the driven mechanism, a housing mounted in said bore for maintaining the other one of said gear members in eccentric relation with the drive shaft and in operative engagement with the first-mentioned gear member and said first-mentioned member in operative relation with the driven mechanism, and means for removably securing the housing to the case whereby the drive unit may be removed from the case independently of the driven mechanism.

RALPH L. DODGE.
JOHN L. COLLINS.
HENRY ROBERT LIETZKE.